INVENTORS
HERBERT BINDER
WALTER J. KRUPICK
BY Karl A. Ohralik
ATTORNEY

United States Patent Office 3,479,889
Patented Nov. 25, 1969

3,479,889
TWO-AXIS INDUCTANCE BRIDGE PICKOFF
Herbert Binder, New Monmouth, and Walter J. Krupick, Succasuna, N.J., assignors to Singer-General Precision, Inc., a corporation of Delaware
Filed Apr. 28, 1967, Ser. No. 634,709
Int. Cl. G01c 19/28
U.S. Cl. 74—5.6           6 Claims

ABSTRACT OF THE DISCLOSURE

Sensing of the orientation of a gyroscope rotor relative to its supporting means along mutually orthogonal axes is achieved by four magnetic sensors disposed at equal distances axially from the rotor in an initial position of the rotor. The sensors are disposed at equal radial distances from the spin axis of the rotor and along mutually perpendicular axes which are perpendicular to the spin axis in an initial position thereof. The sensors each comprise a magnetic core, forked at its end which is nearest to the gyroscope rotor and a winding about each of two forked arms. A magnetic circuit exists with regard to each sensor and includes, in succession, one sensor arm, the air gap between the end of the sensor arm and the gyroscope rotor, a segment of the rotor itself between projections of the ends of the sensor arms, the air gap between the rotor and the other sensor arm, the other sensor arm and the magnetic core portion interconnecting the bases of the arms. The windings on the sensor arms of a pair of opposed sensors are connected in an electrical bridge circuit which is initially balanced and becomes unbalanced in response to changes in magnetic permeance effected by a non-uniformity of spacing between rotor and sensors to provide an electrical output signal indicative of the rotor tilt.

BACKGROUND OF THE INVENTION

This invention relates to gyroscopes and more particularly to the sensing of angular orientation of a gyroscope rotor relative to its supporting structure.

In many applications of gyroscopes, such as in navigation systems, it is important that the orientation of the gyroscope rotor relative to its surroundings be determined with high accuracy and with a minimum of influence on the rotor itself. Complete information about the orientation of the rotor may be obtained by a determination of its orientation about each of two mutually orthogonal axes, each orthogonal to the rotor spin axis.

Various proposals have heretofore been advanced for effecting sensing of a gyroscope rotor tilt or orientation, without making physical contact with the rotor, thus, to minimize the adverse influence of sensing upon the gyroscope operation and accuracy. Such proposals have included two variable air gap transformers having series opposed secondaries and utilizing the gyroscope housing for a magnetic return path. Because of the relatively great length of return path, the dissymmetries in magnetic paths and magnetic leakage problems, this approach suffered problems in stability, particularly in response to temperature variations.

Other sensors not making physical contact with the rotor have included capacitive and optical pickoffs which have also suffered the defects of inaccuracies due to instability in response to temperature variations.

Accordingly, it is a principal object of this invention to facilitate the accurate determination of tilt of a gyroscope rotor about two orthogonal axes by stable means not contacting the gyroscope rotor nor interfering with the rotor movement.

It is another object of this invention to provide effective, simple circuit means for providing electrical signal output indicating tilt of a gyroscope rotor.

Other objects and many additional advantages will be more readily understood by those skilled in the art after a detailed consideration of the following specification taken with the accompanying drawings.

In accordance with this invention, tilt of a gyroscope rotor about two mutually perpendicular axes is sensed by two pairs of sensors co-operative with a magnetizable rotor or a magnetizable ring on the rotor. The sensors of each pair are disposed diametrically opposite each other at equal distances from the rotor axis and the pairs are along the above-mentioned mutually perpendicular axes. Each sensor comprises a bifurcated core and the termination of each bifurcation forms a pole face spaced from the gyroscope rotor. A sensing coil is disposed about each bifurcation and these coils are connected in series. The serially connected pairs of coils of each sensor comprise one leg of a bridge circuit and the pairs of coils of the other sensor of the pair of diametrically opposed sensors, form another leg of the bridge circuit. Any tilt of the rotor alters the air gap between the rotor and the sensors of one or both pairs, altering the magnetic permeance of a magnetic circuit including the bifurcations of a sensor, the air gaps between rotor and the respective bifurcations and the portion of the rotor which is instantaneously between axial projections of the pole faces of the bifurcations on the rotor. Each change in permeance alters the impedance of the corresponding leg of the bridge circuit producing an output from the bridge circuit.

DESCRIPTION OF THE PREFERRED EMBODIMENT

Figure 1:
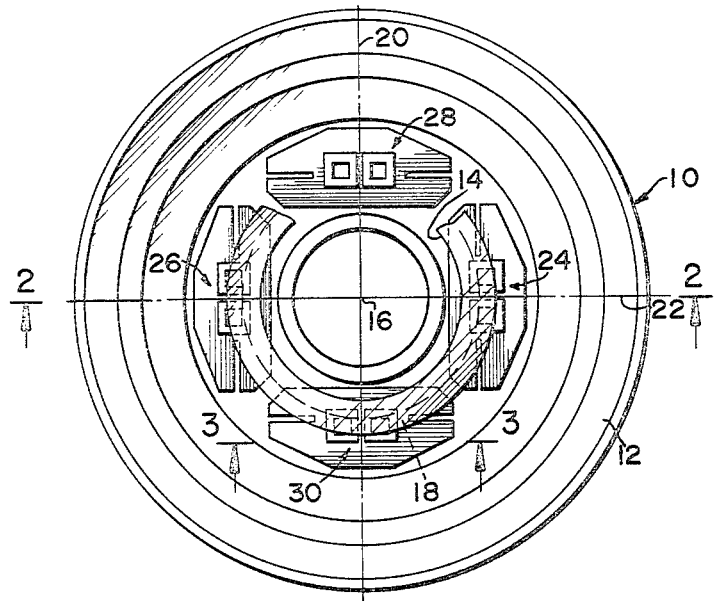
FIGURE 1 is an end view of a gyroscope incorporating the present invention.
Figure 2:
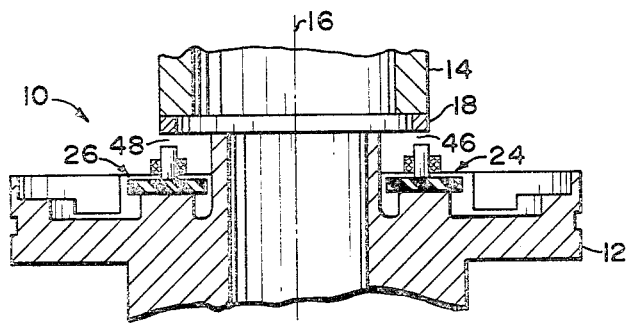
FIGURE 2 is a view taken along section 2—2 of FIGURE 1.

Referring now to the drawing for a detailed description of the invention, in FIGURES 1 and 2, 10 represents generally a gyroscope incorporating this invention and having a housing 12 which may be made of various materials suitable to the uses and environment in which it is to be employed and may be, for example, beryllium, aluminum, steel or even certain suitable materials commonly called "plastics" but which, of course, must be rigid rather than plastic at the temperatures at which the gyroscope is to be operated. An annular gyroscope rotor 14 is provided and is driven about a spin axis 16 by a suitable motor, not shown. The rotor 14 may be made of various magnetic or nonmagnetic materials. In cases wherein it is made of nonmagnetic material, an annular, magnetic member or ring 18 is secured to one end of rotor 14 and, so disposed, is rotatable with the rotor.

The housing 12 may be secured to a vehicle or other structure, the orientation of which is to be sensed and in the operation of the gyroscope 10, the rotor 14 may become tilted relative to its initial position with respect to the housing 12 as shown in FIGURES 1 and 2. Such tilt may be determined by the component tilt of the rotor about each of the axes 20 and 22 shown in FIGURE 1, and which are mutually perpendicular and both of which are perpendicular to rotor spin axis 16.

In accordance with a feature of this invention, for sensing the tilt of rotor 14 about axes 20 and 22, two pairs of sensors 24–26 and 28–30 are mounted in housing 12 and have magnetic elements for sensing the proximity thereto of rotor 14 or ring 18. Thus, sensors 24 and 26 are effective to sense the extent of rotation of rotor 14 about axis 20 and sensors 28 and 30 are effective to sense the extent of rotation of the rotor about axis 22.

Figures 3, 4:
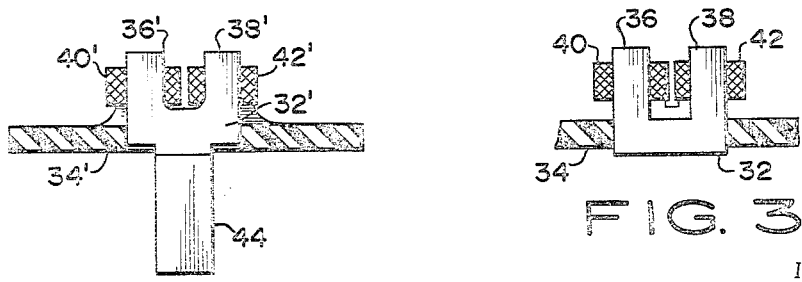
FIGURE 3 is a view taken along section 3—3 of FIGURE 1 and showing the details of a sensor.
FIGURE 4 illustrates an alternative embodiment of sensor.

Referring now to FIGURE 3 of the drawing as well as to FIGURE 1, it is seen that each of the sensors 24 through 30 comprises a magnetic core 32 which may include C- or U-shaped solid or laminated pieces of magnetic material such as iron secured to the housing 12 by any suitable means and a terminal board member 34 having an opening therein to accommodate the core. The core 32 is secured to the housing 12 and terminates in a pair of substantially flat pole faces 36 and 38. The arms of core 28 have wound thereon respective electrical windings 40 and 42 which are connected in series with each other. Alternatively, the cores of the sensors may effectively be of other constructions such as shown in FIGURE 4 of the drawings wherein, for simplicity and practicality in manufacture and installation, the core is made integral with a member 44 extending from a midsection of the core.

As seen most clearly in FIGURE 2, in an initial condition of the gyroscope 10, the ring 18 is uniformly spaced from the pole faces of each of the sensors such as 24 and 26, establishing air gaps such as 46 and 48 between the ring and respective sensors. The tilt of rotor 14 as about axis 20 is effective to alter the uniformity in these air gaps, resulting in an increased gap dimension on one side of gyroscope and a corresponding decrease in gap dimension on the opposite side. It is also clear that the tilt of the rotor may involve an effective simultaneous tilt about each of axes 20 and 22 wherein the gap dimension of each of the two pairs of sensors is changed.

According to well-known principles, the magnetic flux circuit which includes the core of each sensor, the air gaps between ring 18 and the respective pole faces of the sensor core and that segment of ring 18 between projections of the pole faces on the ring is altered by the change in the gap dimension. More specifically, the magnetic permeance of the circuit is a function of the reciprocal of the gap dimension. As a consequence, and also in accordance with known principles, the electrical impedance of windings such as 40 and 42 is a function of the magnetic permeance of the magnetic circuit coupling the winding.

Figure 5:
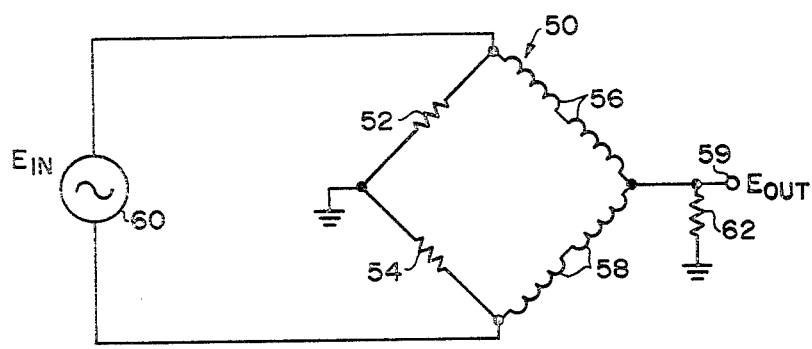
FIGURE 5 schematically illustrates an electrical bridge circuit for providing an electrical signal indicative of rotor tilt about an axis orthogonal to the rotor spin axis.

In accordance with another important feature of this invention, these stated principles are utilized in the electrical bridge circuit represented generally at 50 in FIGURE 5, for providing electrical signals indicative of rotor tilt about one axis. In the circuit 50, a pair of resistors 52 and 54 connected at junction 53 represent balanced resistors of substantially equal resistance, and 56 and 58 represent inductors corresponding to pairs of windings of opposed sensors. That is, inductor 56, for example, represents the equivalent in terms of inductance of windings such as 40 and 42 on a sensor such as 24 and inductor 58 represents the equivalent in terms of inductance of corresponding windings of oppositely disposed sensor 26. Resistors 52 and 54 are serially connected across an alternating potential source 60 and similarly, inductors 56 and 58 are also serially connected across this alternator. The junction between resistors 52 and 54 is grounded and the junction between inductors 56 and 58 is applied to one end of a load resistor, the other end of which is grounded, to provide an output terminal 59. It is clear that an electrically equivalent circuit would result from the interconnection of the junction between resistors 52 and 54 and the end of resistor 62 remote from terminal 59.

It is clear that in a nontilted condition of rotor 14 wherein air gaps 46 and 48 are of equal dimension, circuit 50 is balanced since resistors 52 and 54 are of substantially equal resistance and inductors 56 and 58 are of substantially equal inductance and resistance due to the substantially identical construction of all sensors. In a balanced condition of the circuit, the output potential at terminal 59 with respect to terminal 53, is zero. However, in a tilted condition of rotor 14, the inductance of one of the inductors 56 and 58 becomes increased the inductance of the other is decreased and an output potential results since the impedances of these elements increase and decrease with inductance thereof. The magnitude of such output potential is indicative of the extent of tilt and the phase is indicative of the direction of tilt. In quantitative terms, the output potential is represented by the following equation:

$$E_{OUT} = E_{IN}\left[\frac{R_{52}}{R_{52}+R_{54}} - \frac{Z_{56}}{Z_{56}+Z_{58}}\right]$$

wherein the R's and Z's represent resistance and impedance, respectively, of the elements designated by subscripts.

Figure 6:
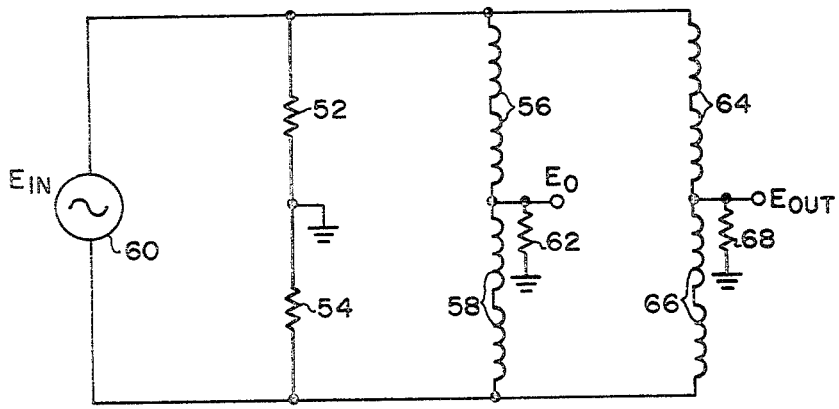
FIGURE 6 schematically illustrates an electrical bridge circuit for providing electrical signals indicative of rotor tilt about each of two axes orthogonal to each other and to the spin axis of the rotor.

For indicating rotor tilt about both axes, in accordance with another feature of this invention, the circuit 50 of FIGURE 5 may be extended as indicated in FIGURE 6 by connecting serially connected inductors 64 and 66 across alternator 60. Inductors 64 and 66 each represent the equivalent of the pairs of windings of the other two, oppositely disposed sensors as, for example, sensors 28 and 30 in FIGURE 1. An output resistor 68 is connected between the junction of resistors 64 and 66 and ground. Output potentials for tilt about the other tilt axis are derived across resistor 68.

Figure 7:
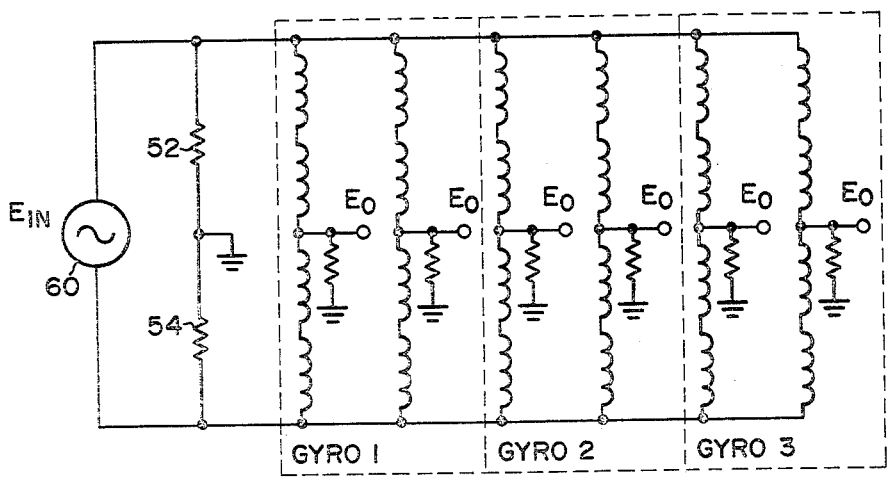
FIGURE 7 schematically illustrates an electrical bridge circuit for providing electrical signals indicative of rotor tilt about each of two axes orthogonal to each other and to the rotor spin axis for each of a plurality of gyroscopes.

In a navigation system utilizing a plurality of gyroscopes having tilt sensing means according to this invention, electrical indication of the tilt about each axis of each gyroscope rotor of the plurality may be provided in accordance with the circuit of FIGURE 7 forming another aspect of this invention. In this circuit, the pairs of sensing coils of each sensor are serially connected with the pairs of sensing coils of an oppositely disposed sensor and the circuit so formed, in each case is connected across alternator 60. Resistors 52 and 54 are also connected across the generator and in each case, the junction between the two pairs of windings is applied across a load resistor to provide an output.

It is, of course, clear that various other constructions of tilt sensing means for sensing orientation of a gyroscope rotor may be proposed within the scope and purview of this invention. For example, it is conceivable that the two sensors of each set may be in alignment but on axially opposite sides of the rotor wheel 14 whereby tilt of the wheel results again in a differential change in the respective air gaps. Also, in the circuit 50, the resistors 52 and 54 may be supplanted by other impedance elements with satisfactory results.

From the foregoing description, it is clear that the present invention affords several advantages over prior art devices. Certain simplicity without sacrifice of effectiveness is afforded by the use of part of the momentum element (rotor 14 or ring 18) as part of the magnetic circuit. The short magnetic paths involved impart both temperature stability and temperature insensitivity to provide a more stable sensing unit as a whole. With regard to prior transformer types of sensors, the present sensors present a relatively low inductance improving electrical potential regulation; the individual windings being separate units, they may be positioned more precisely to form orthogonal pairs, thus providing two perpendicular axes of information; the inductors are less sensitive to noise pickup whereby the electrical signal output is relatively noise free and the inductors in the bridge circuit are frequency insensitive. The number of components in the bridge circuit is minimized because only two impedance elements such as resistors 52 and 54 are required, regardless of the number of axes of information sensed by windings in the bridge circuit.

It should also be noted that the cores may be fabricated from a single piece of material as a complete unit rather than four separate units.

What is claimed is:

1. Tilt sensing means for a gyroscope including a rotor with magnetic means thereon and having a spin axis and mutually orthogonal tilt axes both orthogonal to said spin axis, comprising two pairs of sensors, the sensors of each pair being equidistantly, axially spaced from said magnetic means on said rotor in an initial position thereof, said sensors of each pair being on opposite sides of said spin axis, wherein said sensors each comprise a generally U-haped core member having upstanding leg portions defining a pair of magnetic pole faces, an electrical winding coupling each core leg portion and being serially interconnected, the electrical windings corresponding to each pair of oppositely disposed sensors being in turn serially interconnected, each of said sensors having a magnetic circuit including a portion of said magnetic means and the gaps formed between said magnetic means and said respective pair of pole faces, and means responsive to a change in magnetic permeance of said gaps for producing an electrical signal whereby tilt of said rotor may be electrically indicated said last mentioned means including a pair of serially interconnected impedances of equal value connected in parallel with each of two pairs of serially connected windings corresponding to each orthogonal tilt axis, and means for applying electrical excitation across said serially connected impedances whereby the potential derived across the junction between said impedances and the junction interconnecting one of said two pairs of serially connected electrical windings is representative of the tilt of said rotor about the axis orthogonal to the axis corresponding to said one of two pairs of serially connected windings.

2. An apparatus according to claim 1 wherein the spacings between the magnetic means and each pair of sensors are equal in said initial condition.

3. Tilt sensing means for a gyroscope including a rotor with magnetic means thereon and having a spin axis and mutually orthogonal tilt axes both orthogonal to said spin axis, comprising two pairs of sensors, the sensors of each pair being equidistantly, axially spaced from said magnetic means on said rotor in an initial position thereof, said sensors of each pair being on opposite sides of said spin axis, said sensors each having a magnetic circuit including a portion of said magnetic means and a gap between said magnetic means and the sensor, means responsive to a change in magnetic permeance of said gap for producing an electrical signal whereby tilt of said rotor may be electrically indicated, wherein said sensors each comprise a magnetic core having a pole face at each end equidistantly spaced from said magnetic member on said rotor, an electrical winding about said core and being coupled thereto, means serially interconnecting the windings of each of said pair of sensors, a pair of impedance elements of equal impedance value serially interconnected, and means interconnecting said serially interconnected impedance elements in parallel with said serially interconnected windings whereby the potential derived across the junction of impedance elements and the junction of any pair of serially interconnected windings in response to the application of electrical potential across said serially connected circuits is representative of the tilt of said rotor.

4. Tilt sensing means for a gyroscope including a rotor with magnetic means thereon and having a spin axis and mutually orthogonal tilt axes both orthogonal to said spin axis, comprising two pairs of sensors, the sensors of each pair being equidistantly, axially spaced from said magnetic means on said rotor in an initial position thereof, said sensors of each pair being on opposite sides of said spin axis, said sensors each having a magnetic circuit including a portion of said magnetic means and a gap between said magnetic means and the sensor, means responsive to a change in magnetic permeance of said gap for producing an electrical signal whereby tilt of said rotor may be electrically indicated, wherein said sensors each comprise a magnetic core terminating in substantially flat pole faces lying in the same plane, a pair of serially connected electrical windings on said core, branch circuit means including serially interconnected pairs of windings of each pair of sensors and means connecting in parallel said branch circuits, a pair of serially connected resistors of substantially equal resistance connected in parallel with said branch circuits, whereby the potential derived across the junction between said resistors and a junction between two pairs of windings in one of said branches in response to electrical excitation applied across said branches, is indicative of the tilt of said rotor.

5. A gyroscope rotor tilt sensing apparatus comprising pairs of sensors, said sensors being equidistantly spaced from the intersection of a pair of axes in the same plane, each sensor including an electrical winding, the winding of each sensor being serially connected with the winding of the other sensor of the pair, a pair of impedance elements serially connected, means interconnecting in parallel said serially connected pairs of windings and said pair of serially connected impedance elements to form an electrical bridge circuit, and load circuit means connected between the junction of said impedance elements and each junction of said pairs of windings whereby the change in permeance of the magnetic circuits coupling said windings may be indicated by electrical potentials across said load circuit means in response to electrical excitation applied to said bridge circuit.

6. An apparatus according to claim 5 wherein said sensors are in substantially the same plane parallel to the plane of said intersecting axes.

References Cited

UNITED STATES PATENTS

| | | | |
|---|---|---|---|
| 3,107,540 | 10/1963 | Curriston | 74—5.6 |
| 3,323,377 | 6/1967 | Fraiser et al. | 74—5.6 |
| 3,354,726 | 11/1967 | Krupick et al. | 74—5.6 |

FRED C. MATTERN, JR., Primary Examiner

M. ANTONAKAS, Assistant Examiner